No. 11,812.

Reissued Mar. 13, 1900.

C. J. MAYER.

RAIL BOND.

(Application filed Feb. 12, 1900.)

Witnesses:
Thomas M. Smith,
Richard G. Mapull

Inventor:
Charles J. Mayer,
by J. Walter Douglass
Attorney.

UNITED STATES PATENT OFFICE.

CHARLES J. MAYER, OF PHILADELPHIA, PENNSYLVANIA, ASSIGNOR TO THE PROTECTED RAIL BOND COMPANY, OF SAME PLACE.

RAIL-BOND.

SPECIFICATION forming part of Reissued Letters Patent No. 11,812, dated March 13, 1900.

Original No. 642,554, dated January 30, 1900. Application for reissue filed February 12, 1900. Serial No. 5,027.

*To all whom it may concern:*

Be it known that I, CHARLES J. MAYER, a citizen of the United States, residing at the city of Philadelphia, in the county of Philadelphia and State of Pennsylvania, have invented certain new and useful Improvements in Rail-Bonds, of which the following is a specification.

My invention has relation to a bond for electrically connecting the meeting ends of rails for electric railroads, and in such connection it relates more particularly to the construction and arrangement of such a rail-bond.

The principal objects of my invention are, first, to provide a rail-bond which can be readily applied to the under face of the tram of girder-rails after said rails have been secured in position in the road-bed and with the least possible disturbance of said road-bed; second, to provide a rail-bond not only capable of application to the under face of the tram of said rails, but capable of being so applied or removed without disturbing the fish-plate or similar connection between the rails, and likewise permitting when in position of the removal and replacement of the fish-plate and similar connection without disturbing the rail-bond, and, third, to provide in a rail-bond for connecting the trams of meeting girder-rails, said trams having an upper horizontal face and a lower inclined face, a terminal stud comprising a pillar adapted to enter a suitable perforation in the tram and arranged at right angles to its horizontal face, said pillar projecting from a base or flange, the upper and lower faces of said flange being arranged in planes parallel, respectively, to the under and upper faces of the tram, and said base or flange being beveled or cut away at that portion of its periphery which is adjacent to the web of the rail.

My invention, stated in general terms, consists of a rail-bond constructed and arranged in substantially the manner hereinafter described and claimed.

The nature and scope of my invention will be more fully understood from the following description, taken in connection with the accompanying drawings, forming part hereof, in which—

Figure 2:
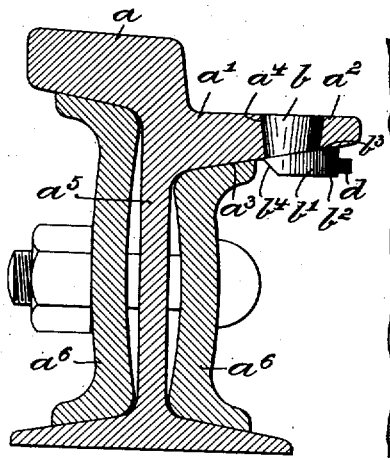
Figure 1:
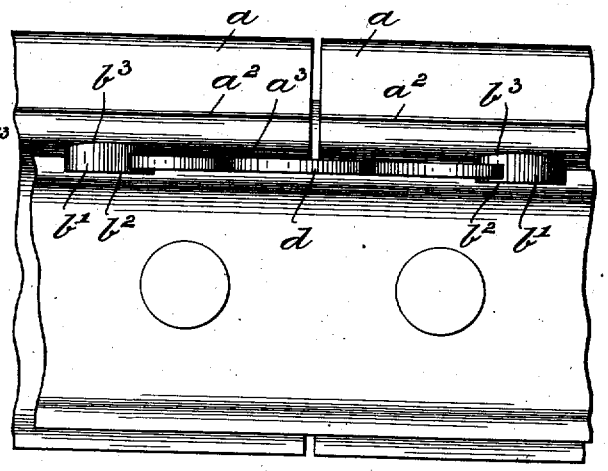
Figure 4:
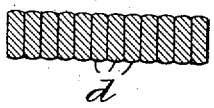
Figure 3:
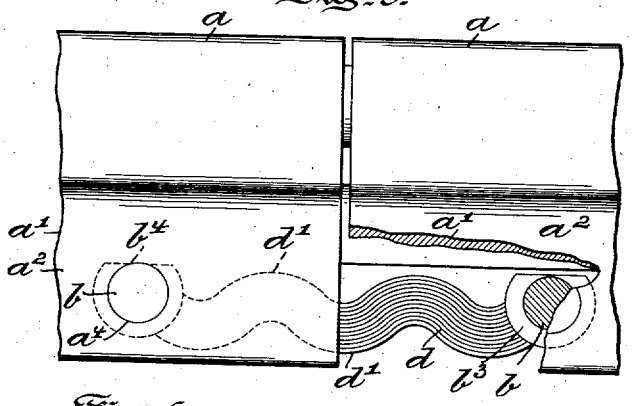
Figure 5:
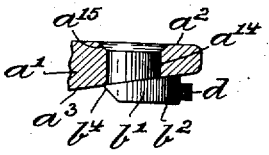
Figure 6:
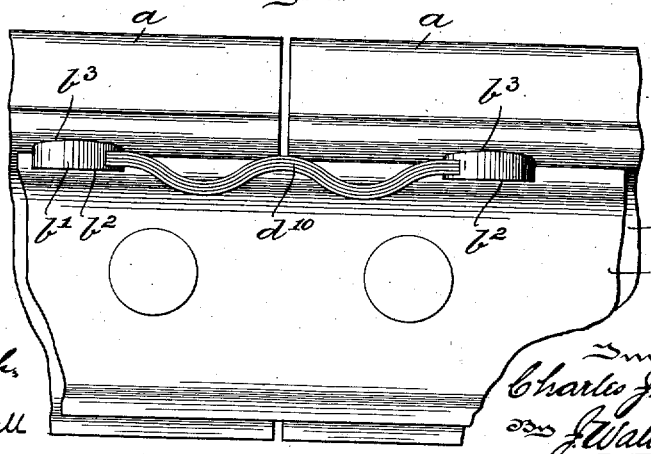
Figure 7:
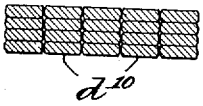

Figure 1 is a side elevational view of a rail-joint provided with a rail-bond embodying main features of my invention. Fig. 2 is a cross-sectional view of one of the rails, taken near one of the terminal studs of the bond, the stud being illustrated in end elevation. Fig. 3 is a top or plan view of Fig. 1 with a part of the tram broken away to illustrate the bond in plan view. Fig. 4 is an enlarged cross-sectional view of the preferred form of flexible connection between the studs of the bond. Fig. 5 is an end view of the bond, showing the same connected in a modified way to the tram of the rail. Fig. 6 is a side elevational view of a rail-joint and a modified form of bond secured thereto; and Fig. 7 is a cross-sectional view, enlarged, of the flexible connection between the studs in Fig. 6.

Referring to the drawings, $a$ $a$ represent the meeting ends of two rails of a type known as "girder-rails" and having laterally-projecting members $a'$ $a'$ at their heads, known as "trams." The upper face $a^2$ of each tram is horizontally disposed and the lower face $a^3$ of the tram is inclined at an angle to said upper face. In the form illustrated in Figs. 1 and 2 the trams $a'$ are each provided with a perforation or opening $a^4$, preferably in the form of a section of a reversed cone, the upper part of the perforation being of wider diameter than the lower part. In each perforation $a^4$ is adapted to be inserted the pillar $b$ of a terminal stud of the bond, which pillar is either substantially cylindrical or very slightly conical, the top being of smaller diameter than the base of the pillar. The pillar $b$ projects at right angles to the base $b'$, the lower face $b^2$ of which base being horizontally disposed and parallel to the upper face $a^2$ of the tram $a'$. The upper face $b^3$ of the base $b'$ is, however, inclined in a plane parallel to the plane of the inclined under face of the tram, against which in the process of fastening it is adapted to rest in close conductive contact. The base $b'$ is likewise beveled or cut away, as at $b^4$, at that portion of its periphery or outline which is adjacent to the web $a^5$ of the rails. The webs $a^5$ of the meeting rails are adapted to be secured together by means of the ordinary fish-plates $a^6$, and the cut-away or beveled portion $b^4$ of the studs permits of the bond being placed in position on the trams or removed therefrom without engaging or interfering with the inner of the fish-plates $a^6$. The form of bevel $b^4$ is also such that when the studs have been once secured to the tram the inner of the fish-plates $a^6$ may be removed without interfering with the secured studs.

In Fig. 5 the form of stud is the same as is illustrated in Figs. 1 and 2; but the perforation $a^{14}$ in the tram, as illustrated in Fig. 5, is not conical, but cylindrical, with an annular recess $a^{15}$ reamed out at its upper edge.

The preferred form of flexible connection between the studs of the bond is illustrated in Figs. 1, 3, and 4. It consists of a series of flat strips or strands $d$, each arranged in a vertical plane and nested together, as shown in Fig. 4. When so nested, the strands or strips are bent in a horizontal plane into a series of sinuous bends $d'$, as clearly shown in Fig. 3. This form of flexible connection, while it will yield to the necessary movement of the rails in either a vertical, horizontal, or longitudinal direction, is, however, adapted to lie closely against the under surface of the tram, and thereby prevent the entrance of dirt or refuse between the bond and tram during the building or repair of the road-bed.

In Figs. 6 and 7 another form of flexible connection is illustrated in which the strands or strips $d^{10}$ are arranged in series and in a horizontal plane. These strips or strands when so arranged are bent, as illustrated in Fig. 6, in a vertical direction into substantially W shape.

Having thus described the nature and objects of my invention, what I claim as new, and desire to secure by Letters Patent, is—

1. In a rail-bond for girder-rails, a terminal stud comprising a pillar and a base, said pillar projecting from said base at right angles to its lower face and said base having an upper inclined face, a lower horizontal face and cut away or beveled at its inner periphery or outline, substantially as and for the purposes described.

2. In a rail-bond, the combination with a girder-rail having a laterally-projecting tram, the upper face of which tram is horizontal and the under face inclined, of a terminal stud comprising a pillar adapted to enter the tram and a base having an upper inclined face adjacent to and parallel with the under inclined face of the tram, and a lower horizontal face, said pillar projecting at right angles to the lower horizontal face of the base and said base being beveled at that part of its periphery adjacent to the web of the rail, substantially as and for the purposes described.

In testimony whereof I have hereunto set my signature in the presence of two subscribing witnesses.

CHARLES J. MAYER.

Witnesses:
J. S. SPEER,
A. H. ENGLAND.